United States Patent Office 2,766,256
Patented Oct. 9, 1956

2,766,256

PROCESS FOR PRODUCING CYCLIC ALIPHATIC SULFIDES

Robert Nelson Kienle, Fair Lawn, N. J., assignor to American Cyanamid Company, New York, N. Y., a corporation of Maine No Drawing. Application July 29, 1954,
Serial No. 446,670

18 Claims. (Cl. 260—327)

This invention relates to a new process for the preparation of cyclic sulfides and more specifically it relates to a process for preparing saturated cyclic aliphatic sulfides having less than five carbon atoms in the ring, which carbon atoms can be otherwise substituted.

The preparation of saturated cyclic monosulfides is a problem of increasing importance in organic chemistry. This is especially true since some compounds of interest pharmacologically have been found to possess such systems. Good methods of synthesizing compounds of this nature are of great importance commercially since the use of such structures has been limited by the lack of adequate synthetic methods.

The methods of producing such ring systems from simple available intermediates are not always certain. Many times the intermediates are very difficult to prepare, and it is a common truism of organic chemistry that the ring closure of 3- and 4-member rings is a much more difficult proposition than is the formation of the more common larger 5- and 6-membered rings. The present method of preparing saturated cyclic sulfides is, most commonly, one which is analogous to the synthesis of simple straight chain sulfides; namely, the reaction of two halogens with an alkali sulfide. The ring closure of 3-membered rings could not be achieved by this method while the yields obtained from the ring closure of 4- and 5-membered rings leave much to be desired. The 3-membered cyclic sulfides, namely, the episulfides, present an especial problem. Among the ways in which they have been prepared in the past has been the reaction of sodium sulfide with 1,2-dithiocyanates and by the reaction of epoxides with thiourea. Neither of these methods gives yields of the order needed in commercial synthesis, and it is a further disadvantage of the former method that the dithiocyanates are difficult to obtain. There is a great need commercially for a good method for synthesizing cyclic sulfides which would be generally applicable to a large variety of chemical structures.

I have found that when an S-(hydroxyalkyl)isothiourea salt is carefully basified, one obtains a cyclic sulfide in which the hydroxyl group has been eliminated and the sulfur of the isothiourea moiety has become attached to the organic residue in its place, forming, by means of this second bond, a cyclic sulfide ring. This is most surprising since S-alkyl isothiourea salts are well known compounds and their alkaline hydrolysis is a standard method for preparing mercaptans, usually by boiling with a large excess of strong caustic. They are usually formed by the reaction of a halogen compound with a thiourea, with the elimination of a halide ion. The alkyl group which has been attached to the halogen becomes bonded to the sulfur of the thiourea. The halide ion becomes the anion of a salt whose cation is an S-alkyl isothiuronium ion, a salt of an S-alkyl isothiourea.

In the performance of my invention, a hydroxyalkyl halogen compound is reacted with a thiourea in a solvent in the usual manner to produce an S-(hydroxyalkyl)isothiourea salt. Other methods of preparing these salts can equally be used to obtain my starting materials. The S-(hydroxyalkyl)isothiourea salt may be isolated, but preferably is further reacted in situ. In either case, it is then carefully basified, without permitting the mixture to become too strongly alkaline. This is done either by using either a mild alkali such as a carbonate, which can be used in excess, or, by careful addition of a stronger alkali such as a hydroxide, avoiding any substantial excess. Instead of the free substituted isothiourea which would be expected, I have found that, spontaneously, the hydroxyl group is eliminated under these conditions with the formation of a cyclic sulfide. In the case of certain alpha-beta-hydroxy halogen compounds, carrying a minimum of other substituents of the carbons (as, for example, ethylene chlorhydrin, propylene chlorhydrin, and 3-chloro butanol-2), it is not necessary to add a stoichiometric amount of alkali or even to add any alkali at all, since there is observed a spontaneous decomposition of the isothiourea salt to produce the corresponding episulfides. In the case of the ethylene and propylene compounds mentioned, the isothiourea salt is not isolated but instead decomposes during the heating necessary for its formation, with the production of the episulfide. With 3-chlorobutanol-2 an isolatable isothiuronium salt is formed, which, however, decomposes on further heating to give the corresponding episulfide directly. In this case, however, a better yield is obtained if a basifying agent is present although it does not have to be added in stoichiometric amounts. With alpha-gamma- and alpha-delta hydroxyhalogeno compounds, the isothiourea salt is more stable and decomposes to the cyclic sulfide only when mildly basified.

In general, the yield of the cyclic sulfide will vary with the number of carbons between the hydroxy group and the isothiourea group in the starting materials. Beyond four carbons, the yield of the cyclic sulfide is negligible. In the area of my invention, the yield of 3-membered episulfides is better than the yields of 4- and 5-membered rings. The yield of the cyclic sulfide also varies with the complexity of the carbon skeleton. The greater the number and complexity of the substituents on the carbons separating the isothiourea group and the hydroxyl group, the lower the yield is apt to be. Thus, the more complicated carbon skeletons give lower yields of cyclic sulfides, while the straight chain alpha-omega halogeno alcohols give the best yields.

The reaction with thiourea itself may be described schematically by the following equation:

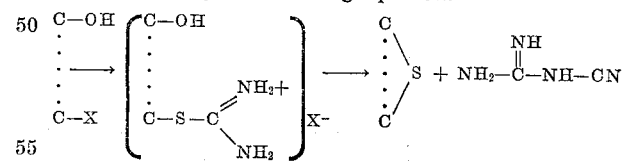

in which X is a halogen atom. It is evident from this equation that this reaction is quite different from the methods of preparing cyclic sulfides heretofore known. For example, the reaction of an epoxide with thiourea to give an episulfide produces as its by-product urea while the by-product appearing in the above equation is an entirely different type of compound, namely, cyanoguanidine. Furthermore, the yields obtained by the epoxide-thiourea method are, in general, too poor for commercial utilization, whereas the yields in the process of my invention can be so used. I do not wish to be limited to any specific mechanism since the route by which this reaction proceeds is not fully known, but it is clear that it proceeds by a different route than that of this reaction with epoxides. The equation above only gives overall results. This different route and the resulting increased yields were not to be predicted.

The starting materials for the process of my invention are S-(hydroxyalkyl)thiourea salts, prepared usually from hydroxy halogen compounds in which the carbons carrying the hydroxyl and the halogen are either directly bonded or are separated by not more than two other carbons. The various halogenoalkanols are usually used to prepare the isothiourea salts because of availability and price. As a result the anion of the isothiourea salt is usually a halide. However other anions can also be used, such as sulfate, benzene-sulfonate, nitrate, and the like. The particular anion is not of critical importance since it does not appear in the final product. The compounds which may be used to prepare my starting materials include such compounds as ethylene chlorhydrin, ethylene bromhydrin, propylene chlorhydrin, propylene bromhydrin, 1-chlorobutanol-2, 3-chloro-butanol-2, 1-chloro-2-methyl propanol-2, 3-chloro-propanol-1, 4-chloro-butanol-1, 4-chloro-butanol-2, 4-chloro-pentanol-2, 4-chloro-2-ethanol-butanol-1, 2-chloro-1-phenyl-ethanol-1, 1-phenyl-2-bromopropanol-1, 3-phenyl-2-chloro-propanol-1, 1-chloro-3-phenyl-propanol-2 and derivatives of these latter having nuclear substituents on the aromatic ring as well as similar bromo or iodo alcohols and the like. In the above cases the starting materials for my invention are isothiourea salts in which the isothiourea group replaces the halogen.

An isothiourea salt may be prepared in the usual manner from any thiourea. Usable in preparing isothiourea salts are substituted thioureas in which substituents such as alkyl, aryl and aralkyl may be present as substituents on the nitrogens. Examples of these are N,N'-dimethyl-thiourea, N,N'-diphenyl-thiourea, N,N'-ditolyl-thiourea, N,N'-di(chloro-phenyl)-thiourea, N - phenyl-thiourea, N-methyl-thiourea, N,N,N'-trimethyl-thiourea, and the like. The nature of substituents on the nitrogen of the thiourea effects the ease of the formation and splitting of the isothiourea salt. Complicated substituents tend to reduce the ease by which these compounds are formed but to increase the ease by which they are decomposed. Unsubstituted thiourea is greatly the preferred compound for use in my invention because of its extremely low price, and the excellent yields obtainable.

The solvents which are usable in my process must have a dielectric constant between 3 and 75. A maximum yield is obtained with solvents of dielectric constant in the vicinity of 40. Above and below this value, the yield of product is smaller. Water with a dielectric constant of 80 gives no yield whatsoever, while hydrocarbon solvents of dielectric constant below 2.5 give negligible yields. The solvents which have been observed to be usable include such aromatic solvents as nitrobenzene; the lower alcohols such as methanol, ethanol, propanol, butanol, and isopropanol; the glycols such as ethylene glycol, and propylene glycol; other polyhydric alcohols such as glycerol; and the ethers and cyclic ethers such as the dibutyl ether and dioxane, as well as dimethyl and diethyl formamide.

As discussed previously, it is necessary in most cases to basify the isothiourea salt in order to facilitate the formation of a cyclic sulfide, although in the case of some simple alpha-halogeno beta-hydroxy compounds the base is not needed except to increase the yields. The preferred basifying agent is usually an alkali carbonate such as potassium and sodium carbonate, but it is possible to use other carbonates such as lithium, calcium, barium, and the like. Because these are mild alkalis, they can be used in excess. When used cautiously, with avoidance of substantial excess, the stronger alkalis such as sodium hydroxide, potassium hydroxide, calcium hydroxide, barium hydroxide, ammonium hydroxide, quaternary ammonim hydroxides and the like may also be used. It is generally necessary to keep the mixture no more alkaline than results from an excess of potassium carbonate.

It is an advantage of this method of preparation that it affords a good method to obtain ring systems not previously obtainable in an easy manner, as for example, the 4-membered rings. It is a further advantage of the method of my invention that many of the starting materials are much more easily obtainable than those to be used in other methods of preparation. It is a still further advantage of my invention that the yields of cyclic sulfides obtained thereby are in most cases higher than any previously obtained by methods of the prior art.

My invention may be illustrated by the following examples which are by weight unless otherwise specified.

*Example 1*

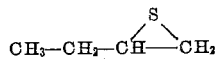

A mixture of 3 parts of 1-chlorobutanol-2, 2.7 parts of thiourea, and 7.0 parts of ethanol is refluxed until the reaction is substantially complete. 2.5 parts of potassium carbonate and 0.5 part water are added to the mixture, which is then refluxed until conversion to the episulfide is substantially completed. The reaction mixture is distilled and the distillate below 82° C. is collected. The mixture of alcohol and product is diluted with an equal volume of water, causing a separation into two layers. The non-aqueous layer is extracted from the aqueous layer with ether and the extract is dried with anhydrous sodium sulfate. Careful fractionation of the dry extract isolates a good yield of 1,2-epithiobutane. During the distillation of the reaction mixture dicyandiamide appears as a solid in the condenser.

*Example 2*

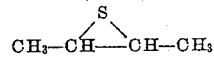

The procedure of Example 1 is followed, using as a starting mixture 4.0 parts of 3-chlorobutanol-2, 2.8 parts of thiourea, and 7.0 parts of ethanol and adding 2.5 parts of potassium carbonate at the second step. A good yield of 2,3-epithiobutane is obtained. When the procedure is repeated, omitting the addition potassium carbonate and the second refluxing period, a smaller yield of this product is isolated.

*Example 3*

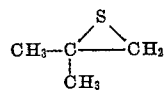

The procedure of Example 1 is repeated, using a starting mixture of 4 parts of 2-methyl-1-chloropropanol-2, 2.8 parts of thiourea and 7.0 parts of ethanol and adding 4 parts of potassium carbonate at the second step. The product, 2-methyl-1,2-epithiopropane, is isolated in fairly good yield.

A similar result is obtained when an equivalent quantity of 1-chloro-4-phenyl-butanol-2 is used in place of the 2-methyl-1-chloro-propanol-2, 4-phenyl - 1,2 - epithiobutane being obtained. Similarly, the use of equivalent quantities of 1-chloro-3-phenyl-propanol-2 gives 3-phenyl-1,2-epithiopropane.

*Example 4*

A mixture of 50 parts of 3-chloropropanol-1, 40 parts of thiourea, and 200 parts of ethanol is refluxed until the reaction is substantially complete. Upon the addition of ether, a white precipitate of 3-hydroxy-propyl-1-S-2-isothiuronium hydrochloride appears and is isolated by filtration.

Twenty parts of the thiuronium salt is added to a slurry of 45 parts of potassium carbonate in 30 parts of water. The mixture is stirred until the reaction is complete. Extraction of the reaction mixture with ether, followed by drying the extract yields, upon fractionation of the dried extract, trimethylene sulfide.

*Example 5*

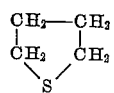

A mixture of 10 parts of 4-chlorobutanol-1, 7 parts of thiourea, and 62.5 parts of alcohol is refluxed until the conversion to the isothiuronium salt is substantially complete. An ethanolic solution of sodium hydroxide is then added gradually until the mixture is substantially neutral. The mixture is then diluted with twice its volume of saturated brine and extracted with ether. The ether extract, after being dried, is carefully fractionated to give a good yield of tetramethylene sulfide (or thiophane).

A similar result is obtained if equivalent amounts of 4-chloro-pentanol-2 or 4-chloro-2-ethylbutanol-1 are used.

*Example 6*

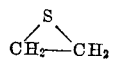

Molecular equivalents of ethylene chlorohydrin and thiourea are heated gently in alcoholic solution. The vapors evolving from the mixture are condensed. A very good yield of ethylene episulfide is obtained.

*Example 7*

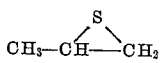

The procedure of Example 6 is followed using propylene chlorohydrin in place of ethylene chlorohydrin. A good yield of 1,2-epithiopropane is obtained.

The same procedure is followed substituting the following various solvents for the alcohol: exylene, dibutyl ether, dioxane, butyl alcohol, propyl alcohol, propylene chlorohydrin, nitrobenezene, ethylene glycol, diethyl formamide, and water. The yields of episulfide varies from zero (for xylene or water) to good for methyl alcohol.

I claim:

1. A process of preparing a cyclic alkylene monosulfide having less than five carbon atoms in the ring which comprises adding to a mixture of a solvent and an S-(hydroxy-alkyl)isothiourea salt, said solvent having a dielectric constant of greater than 3 but not greater than 75, said hydroxyalkylpseudoisothiourea salt having the hydroxyl and a pseudoisothiourea group on different carbon atoms, said carbon atoms having no more than two additional carbon atoms separating them, sufficient alkali to make the mixture alkaline but avoiding substantial excess.

2. A process of claim 1 in which the isothiourea group is unsubstituted on the nitrogens.

3. The process of claim 2 in which the alkali is potassium carbonate.

4. The process of claim 2 in which the alkali is sodium hydroxide.

5. The process of claim 3 in which the solvent is a lower alkanol.

6. The process of claim 5 in which the solvent is ethanol.

7. The process of claim 4 in which the solvent is ethanol.

8. The process of claim 5 in which the S-(hydroxyalkyl) isothiourea has four carbons separating the hydroxyl from the isothiourea group.

9. The process of claim 8 in which the S-(hydroxyalkyl) isothiourea salt is a salt of S-(4-hydroxybutyl)-isothiourea.

10. The process of claim 5 in which the S-(hydroxyalkyl)isothiourea salt has three carbons separating the hydroxyl from the isothiourea group.

11. The process of claim 10 in which the S-(hydroxyalkyl) isothiourea salt is a salt of S-(3-hydroxypyropyl)-isothiourea.

12. The process of claim 5 in which S-(hydroxyalkyl)isothiourea salt has the isothiourea group and the hydroxyl on adjacent carbons.

13. The process of claim 12 in which the S-(hydroxyalkyl)isothiourea salt is a salt of S-(2-hydroxy-1-butyl)-isothiourea.

14. The process of claim 12 in which S-(hydroxyalkyl)isothiourea salt is a salt of S-(3-hydroxy-2-butyl)-isothiourea.

15. The process of claim 12 in which the S-(hydroxyalkyl)isothiourea salt is a salt of S-(2-hydroxy-2-methyl-1-propyl)isothiourea.

16. The process of preparing an episulfide selected from the group consisting of ethylene-episulfide and propylene episulfide which comprises heating the corresponding chlorohydrin with a thiourea having a free hydrogen.

17. The process of claim 16 in which ethylene chlorohydrin is heated with thiourea in ethanol solution.

18. The process of claim 16 in which propylene chlorohydrin is heated in ethanol with a thiourea.

References Cited in the file of this patent

Olin: JACS 52:3322-27 (1930).